(No Model.)

C. C. BROOKS.
KNIFE.

No. 592,961. Patented Nov. 2, 1897.

Witnesses.
A. C. Perry
Elias Thomas

Inventor.
Chapin C. Brooks.
by W. E. Bird
Attorney.

UNITED STATES PATENT OFFICE.

CHAPIN C. BROOKS, OF WAYNE, MAINE.

KNIFE.

SPECIFICATION forming part of Letters Patent No. 592,961, dated November 2, 1897.

Application filed January 16, 1895. Serial No. 535,055. (No model.)

*To all whom it may concern:*

Be it known that I, CHAPIN C. BROOKS, a citizen of the United States, residing at North Wayne, in the county of Kennebec and State of Maine, have invented certain new and useful Improvements in Knives; and I do hereby declare that the following is a full, clear, and exact description of the invention, which will enable others skilled in the art to which it appertains to make and use the same.

This invention relates to improvements in "cutters"—such, for instance, as hay and other knives and other edged tools employing a serrated beveled cutting edge.

Hitherto such cutters and knives have been beveled and ground on one edge only.

It is the purpose of my invention to produce a cutter or knife having a serrated cutting edge which may be ground on each side as are ordinary knives and without danger of destroying the serrations.

Figure 1:
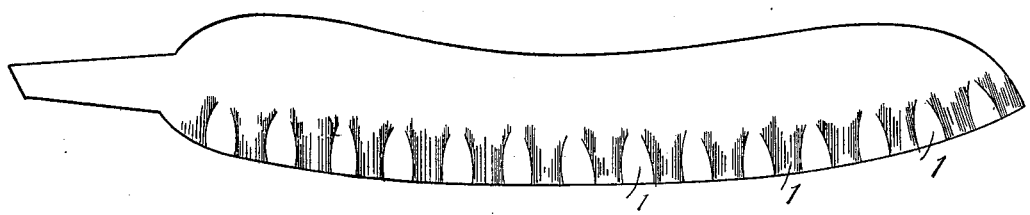
Figure 2:
Figure 3:
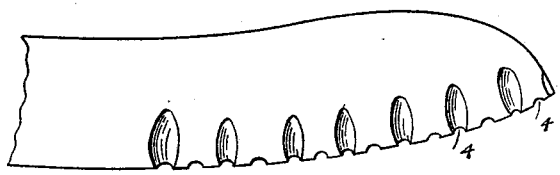
Figure 4:
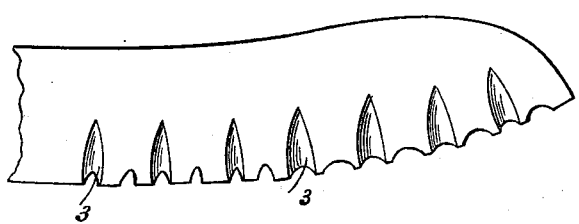
Figure 5:

Referring to the drawings, Figure 1 is a side elevation of the knife-blank ready for grinding; Fig. 2, a bottom plan of the knife-blank ready for grinding. Fig. 3 is a side elevation of the knife-blade when ground. Fig. 4 is a side elevation of the blank shown in Fig. 5. Fig. 5 is a bottom plan of a modification of the knife-blank before grinding.

My invention as herein described and shown is embodied in a bread-knife, but it is obvious that the same method of construction may be applied to various edged tools. In constructing the knife a sheet of steel is subjected to the action of suitable dies, whereby it is provided with a series of through-and-through corrugations 1 1, the concavity on one side causing a corresponding convexity upon the other side, the concave corrugations alternating with the convex. These corrugations should be so deep as to alternately pass the center of the knife-blank, as is indicated by the dotted line in Fig. 2. The blank so constructed is now ground upon both sides, whereby each side is beveled, the metal being removed sufficiently to form the teeth or serrations 4 4. (See Fig. 3.) These teeth are formed in consequence of the convexity on the respective sides being first worn away by the grinding process, the spaces 2 between the adjacent corrugations forming the spaces between the teeth.

The sharpening of the blade when dull is accomplished by grinding on both sides in the same manner as when forming the teeth, or, in short, as other knives are ground.

Other methods of preparing the knife-blank will suggest themselves. For instance, portions of either side the blank may be milled out at alternate intervals, as shown in Figs. 4 and 5. Upon grinding the portions thus milled out substantially the same result is effected as when the corrugations are made by dies.

It will be noticed that in the device I have shown the milled notches are alternately disposed upon opposite sides of the blade. This disposition of the recesses has a certain useful result—namely, it reduces the friction of the knife in its passage through the loaf, and for this reason it reduces the amount of crumbs made in such cutting. I am aware that in this feature my invention is not in any sense a pioneer one, as the blade with a series of notches upon one side for the same purpose is well known, but to accomplish the end fully it will be necessary to arrange the said notches alternately upon opposite sides, and when used in hot bread the double notching will avert the "making it heavy," as the housewives term it—that is, by its friction causing the soft particles to adhere in a heavy mass. A further new and useful result of my arrangement of the notches is that they cause even cutting of the knife in the housekeeper's hand, obviating the undesirable tendency to "chisel" or cut in a slanting direction.

What I claim is—

1. A bread-knife having in its cutting edge the milled recesses 3, alternately disposed upon opposite sides of the said knife.

2. A bread-knife having in its cutting edge a series of recesses 3, alternately disposed upon opposite sides of the blade as set forth, each recess having a cutting edge beveled from the opposite side of the knife, substantially as described.

In testimony that I claim the foregoing as my invention I have hereunto set my hand this 5th day of January, A. D. 1895.

CHAPIN C. BROOKS.

In presence of—
GEO. E. BIRD,
A. C. BERRY.